(Model.)                  J. T. JONES.                10 Sheets—Sheet 2.
                          SEWING MACHINE.
No. 519,676.                              Patented May 8, 1894.
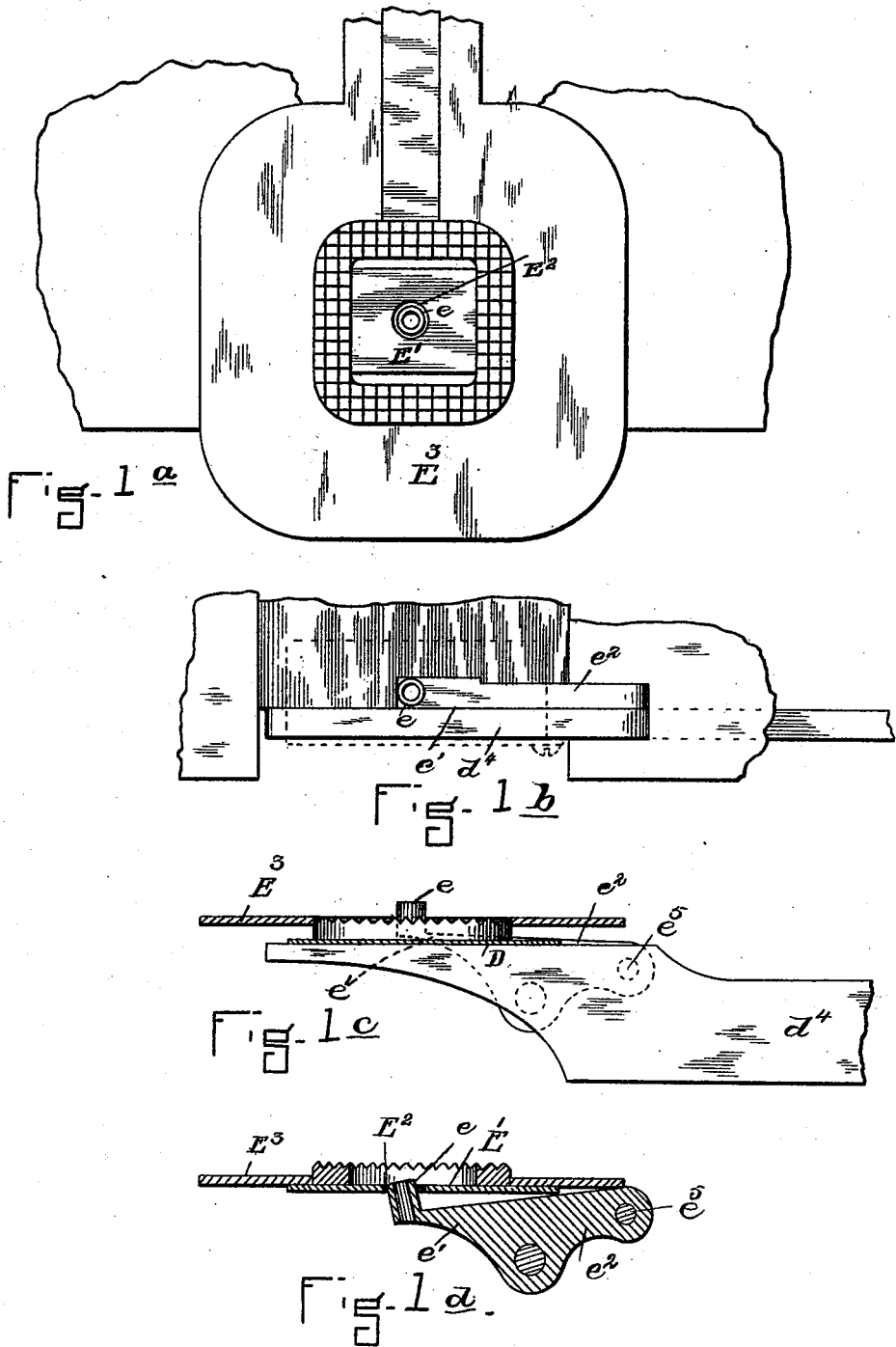
WITNESSES.                               INVENTOR.

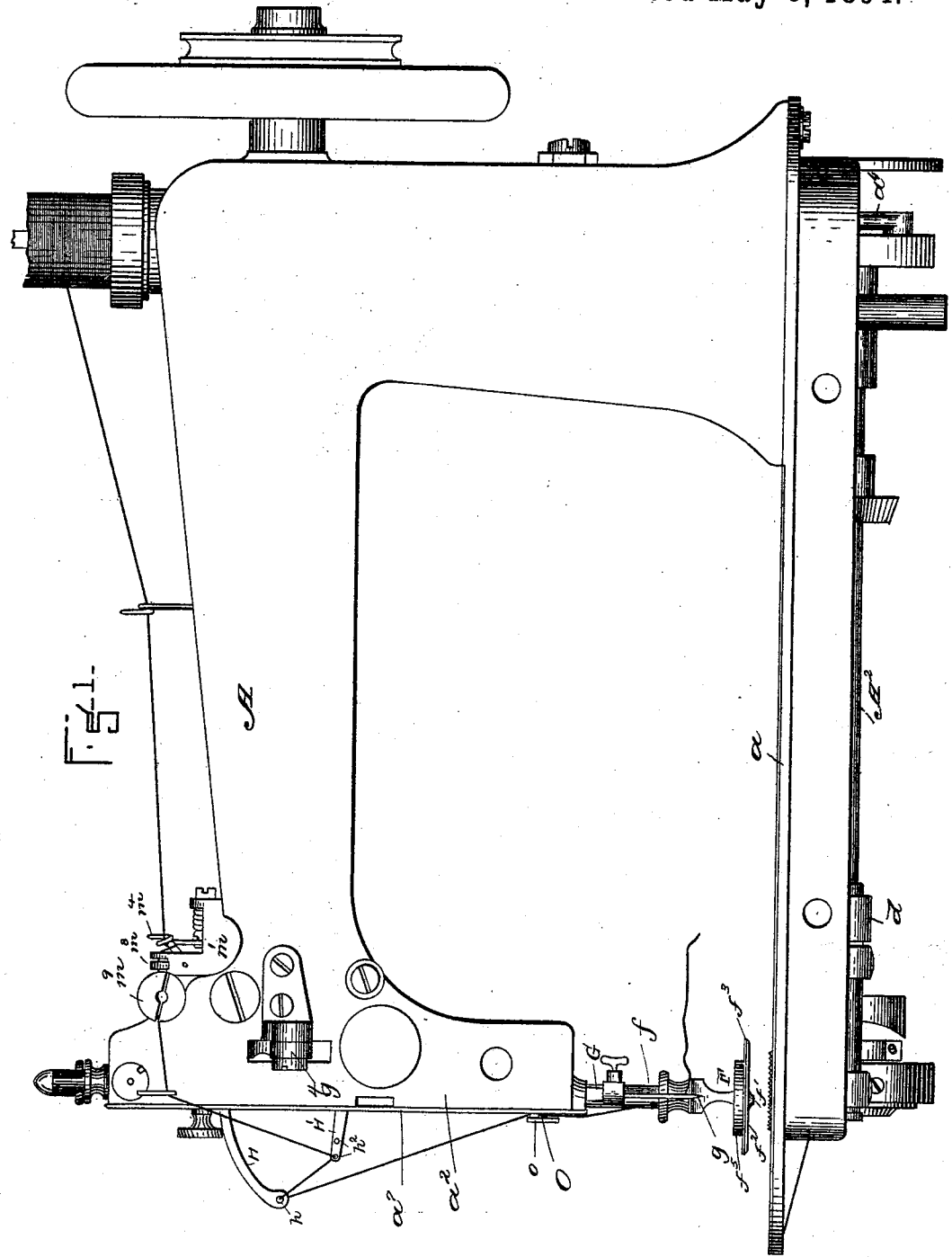

(Model.)
10 Sheets—Sheet 3.
J. T. JONES.
SEWING MACHINE.
No. 519,676.
Patented May 8, 1894.
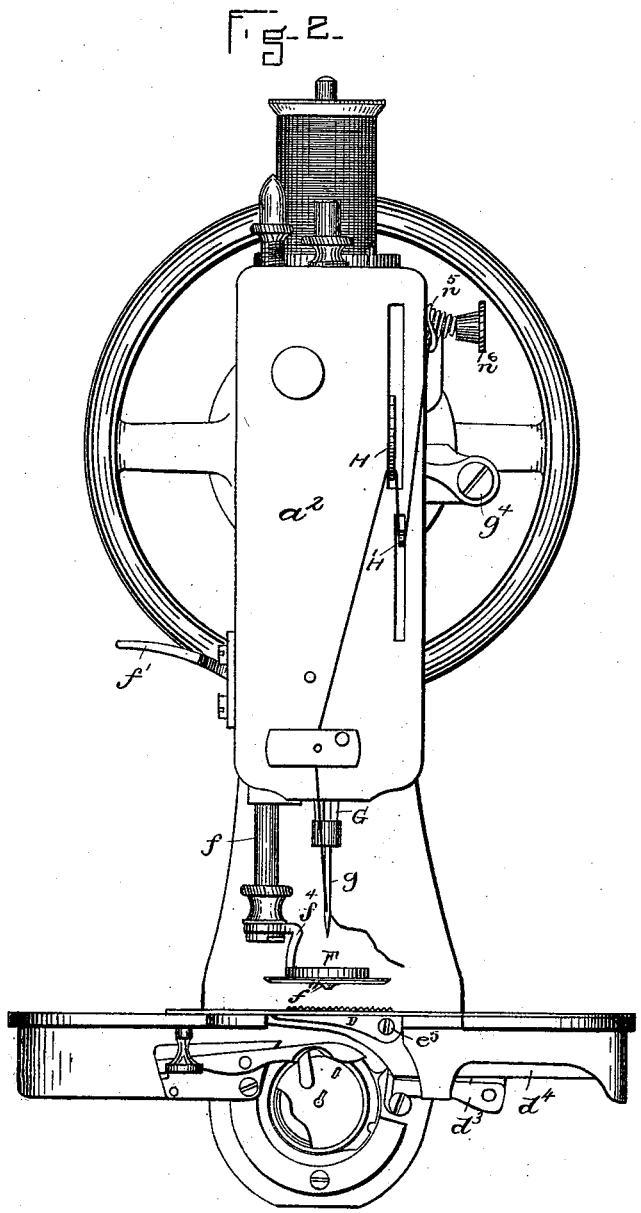
WITNESSES
INVENTOR

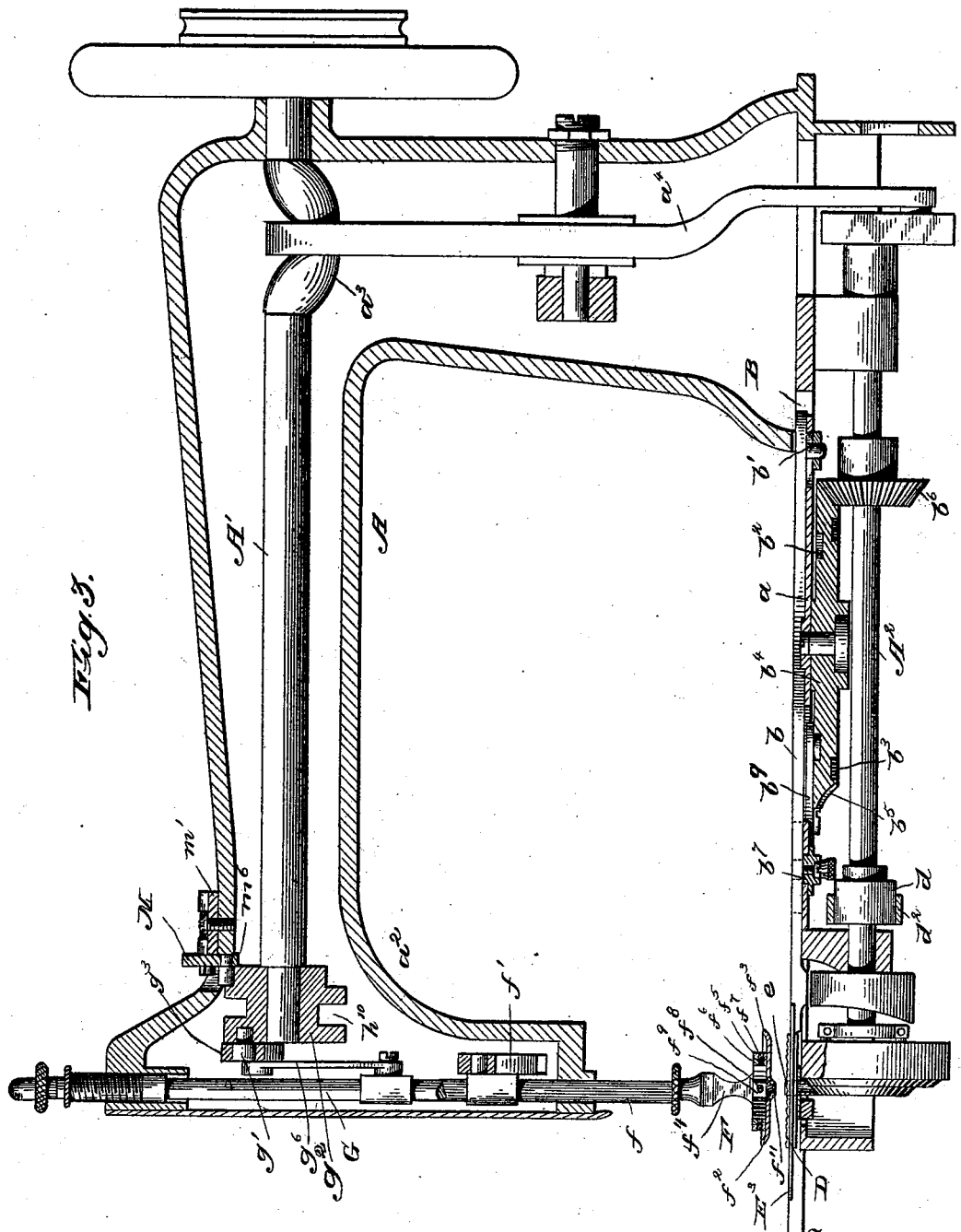

(Model.)

10 Sheets—Sheet 5.

J. T. JONES.
SEWING MACHINE.

No. 519,676.

Patented May 8, 1894.

WITNESSES.
Rich A. George.
A. O. Jones.

INVENTOR.
J. Thos. Jones.

THE NATIONAL LITHOGRAPHING COMPANY,
WASHINGTON, D. C.

(Model.)
J. T. JONES.
SEWING MACHINE.
No. 519,676.   Patented May 8, 1894.
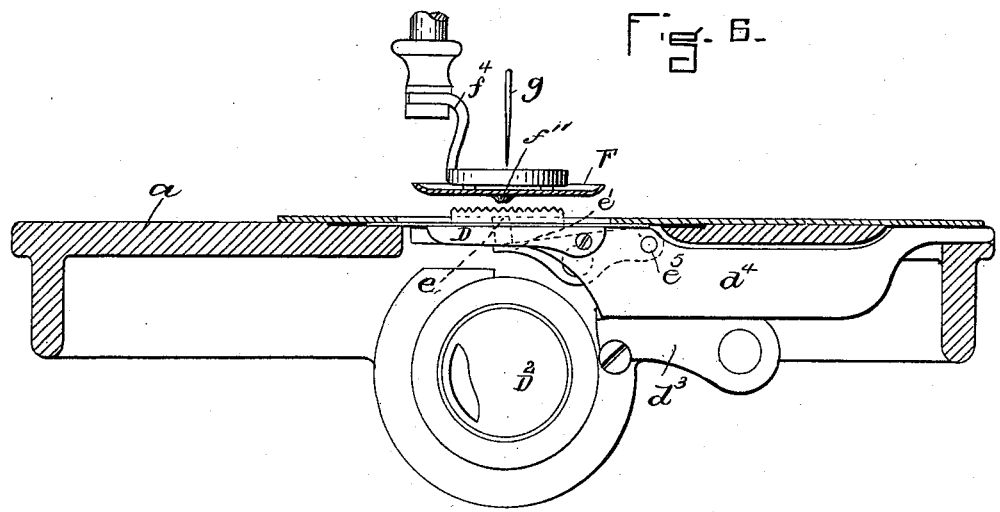
Fig. 6.
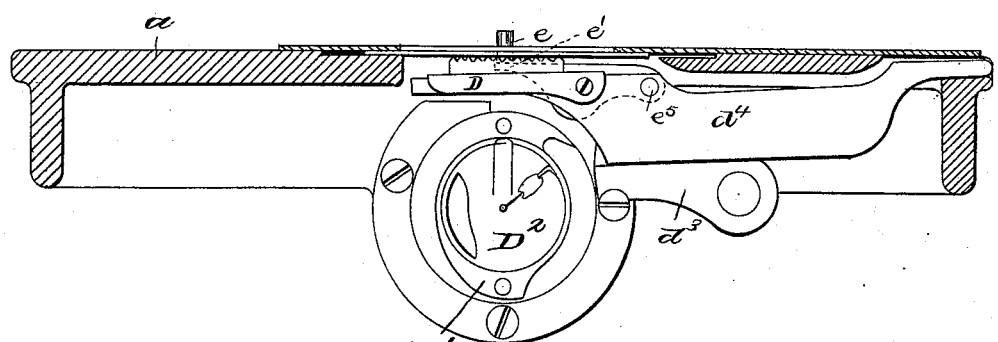
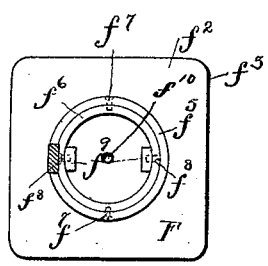
Fig. 7.
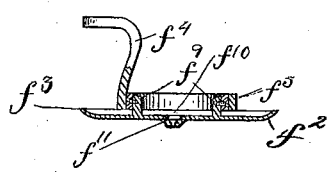
Fig. 8.   Fig. 9.
WITNESSES.
J. M. Dolan
W. H. Whitney
INVENTOR
J. Thomas Jones
by his attys
Clarke & Raymond

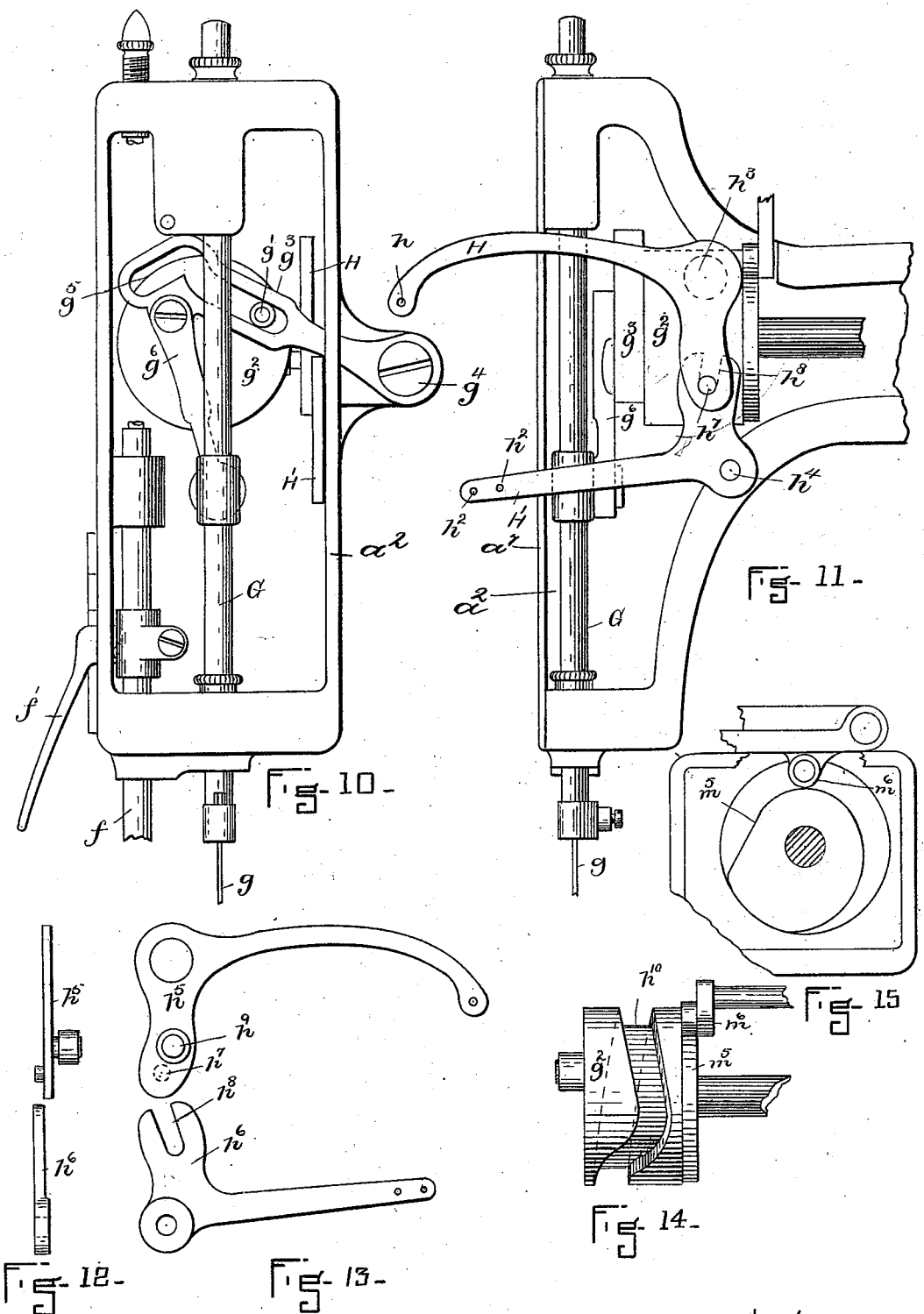

(Model.)
10 Sheets—Sheet 8.
J. T. JONES.
SEWING MACHINE.
No. 519,676. Patented May 8, 1894.
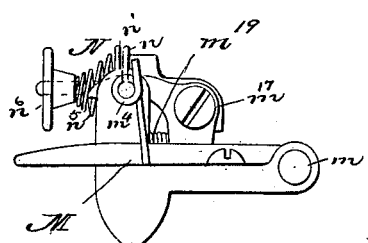
Fig. 16.
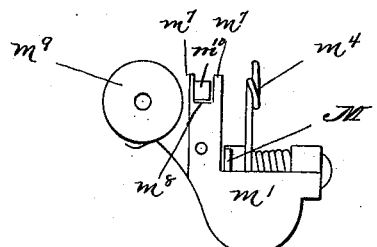
Fig. 17.
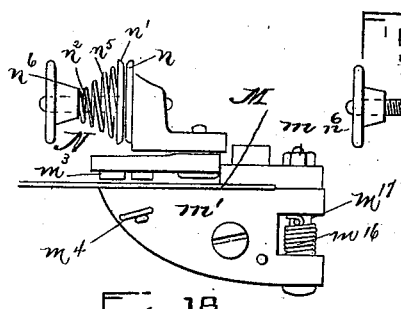
Fig. 18.
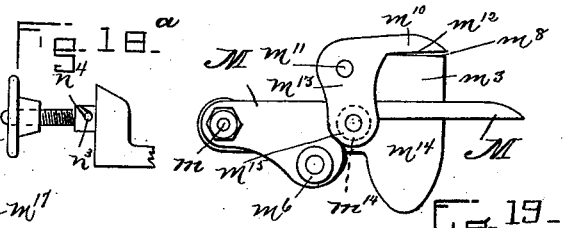
Fig. 18ª. Fig. 19.
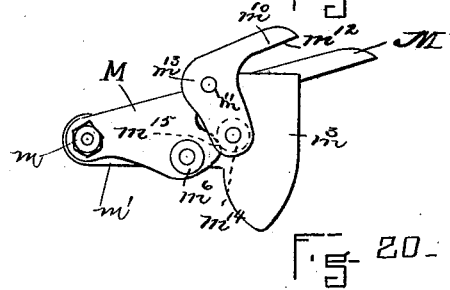
Fig. 20.
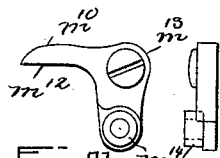
Fig. 21.
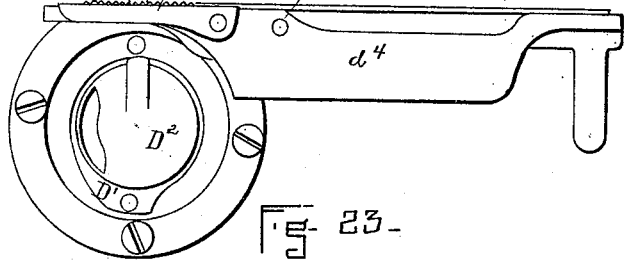
Fig. 22. Fig. 23.
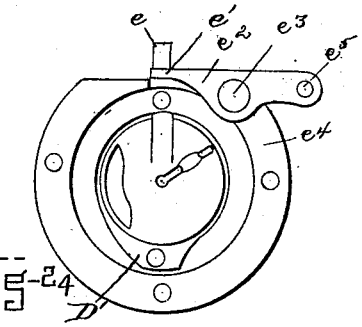
Fig. 24.
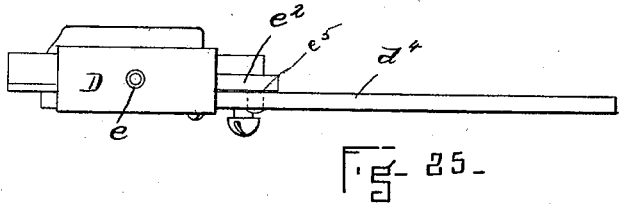
Fig. 25.
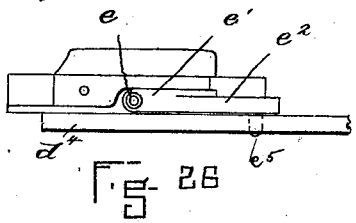
Fig. 26.
WITNESSES
J. M. Dolan
W. H. Whitney
INVENTOR
J. Thomas Jones
by his att'ys
Clarke & Raymond (Model.)
J. T. JONES.
SEWING MACHINE.
No. 519,676. Patented May 8, 1894.
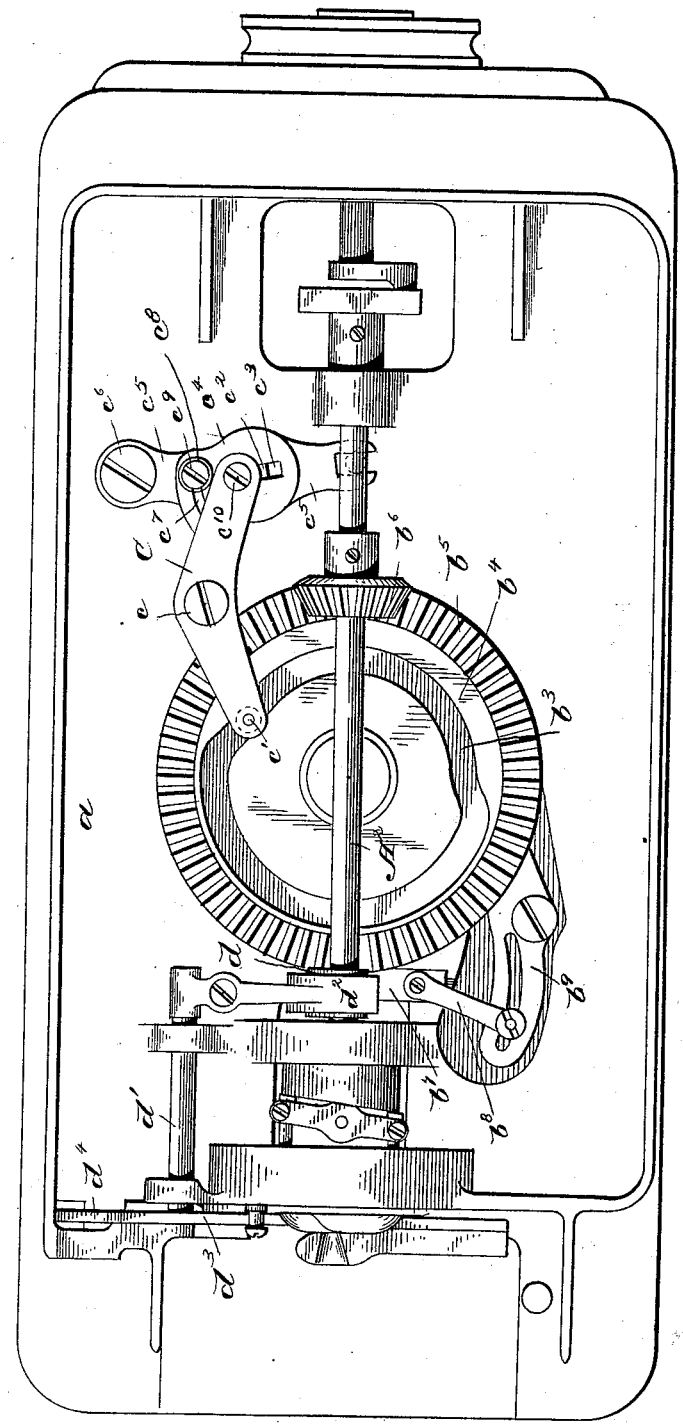

(Model.)
10 Sheets—Sheet 10.
J. T. JONES.
SEWING MACHINE.
No. 519,676.
Patented May 8, 1894.
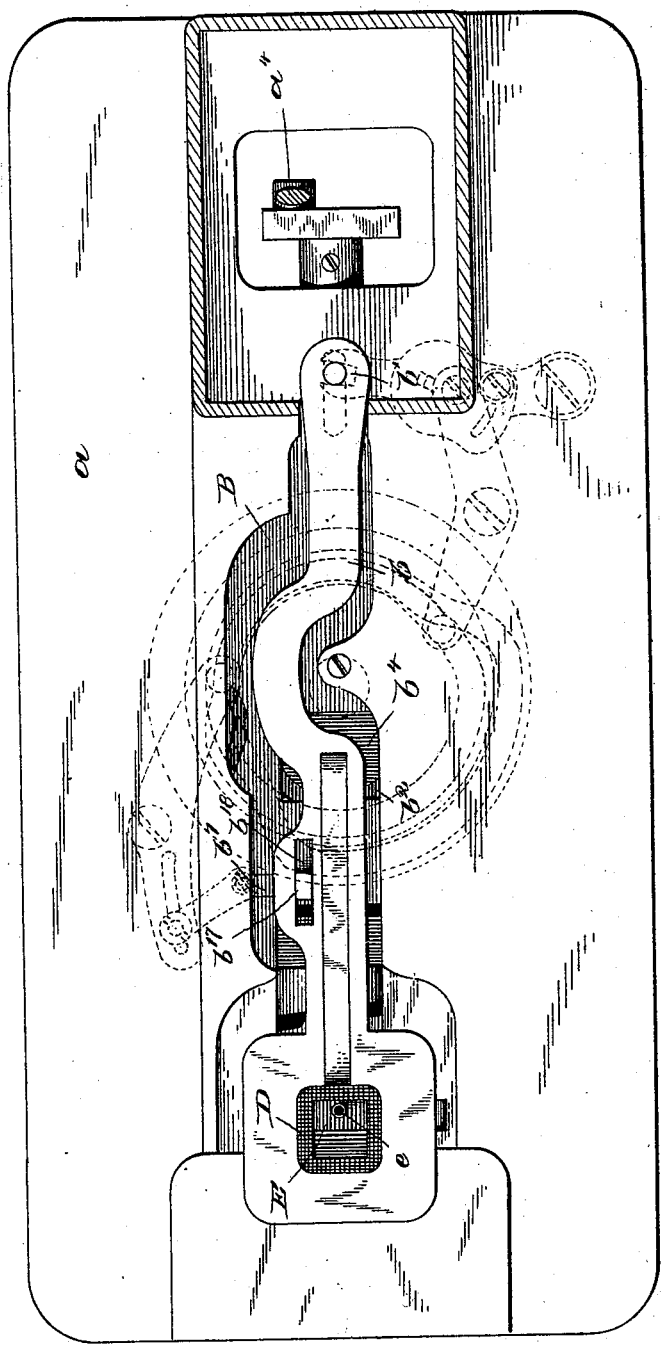
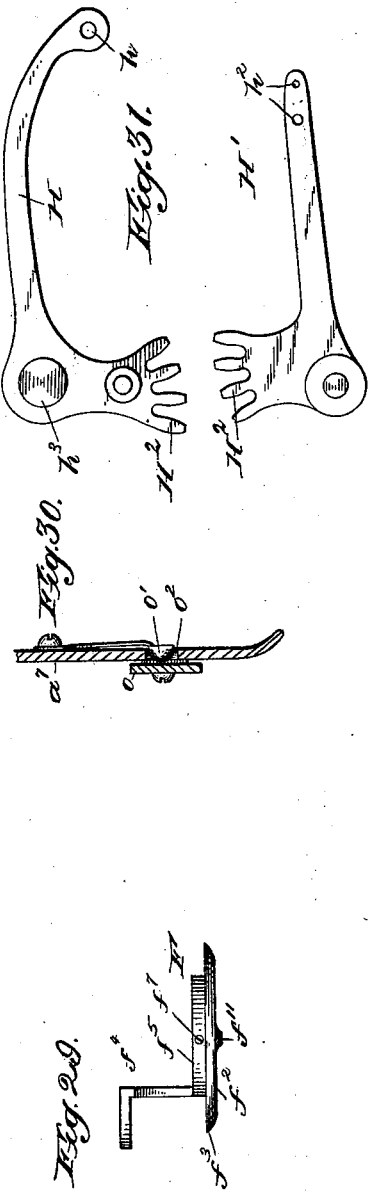
Witnesses
John Thomas Jones
Inventor

UNITED STATES PATENT OFFICE.

JOHN THOS. JONES, OF UTICA, NEW YORK.

SEWING-MACHINE.

SPECIFICATION forming part of Letters Patent No. 519,676, dated May 8, 1894.

Application filed November 20, 1890. Serial No. 372,053. (Model.)

*To all whom it may concern:*

Be it known that I, JOHN THOMAS JONES, a citizen of the United States, residing at Utica, in the county of Oneida, in the State of New York, have invented a new and useful Improvement in Sewing-Machines, of which the following is a full, clear, and exact description, reference being had to the accompanying drawings, forming a part of this specification, in explaining the same.

The invention is an improvement upon the sewing machine known as the "Standard" and it relates to various modifying features of the stitch forming mechanism in connection with the feeding mechanism described in my Patent No. 420,073, dated January 28, 1890, whereby the machine is converted from an ordinary straight line stitching machine to a machine for embroidering, over-seaming, feather and fancy stitching and for ornamental stitching of a great variety of forms.

Figure 4:
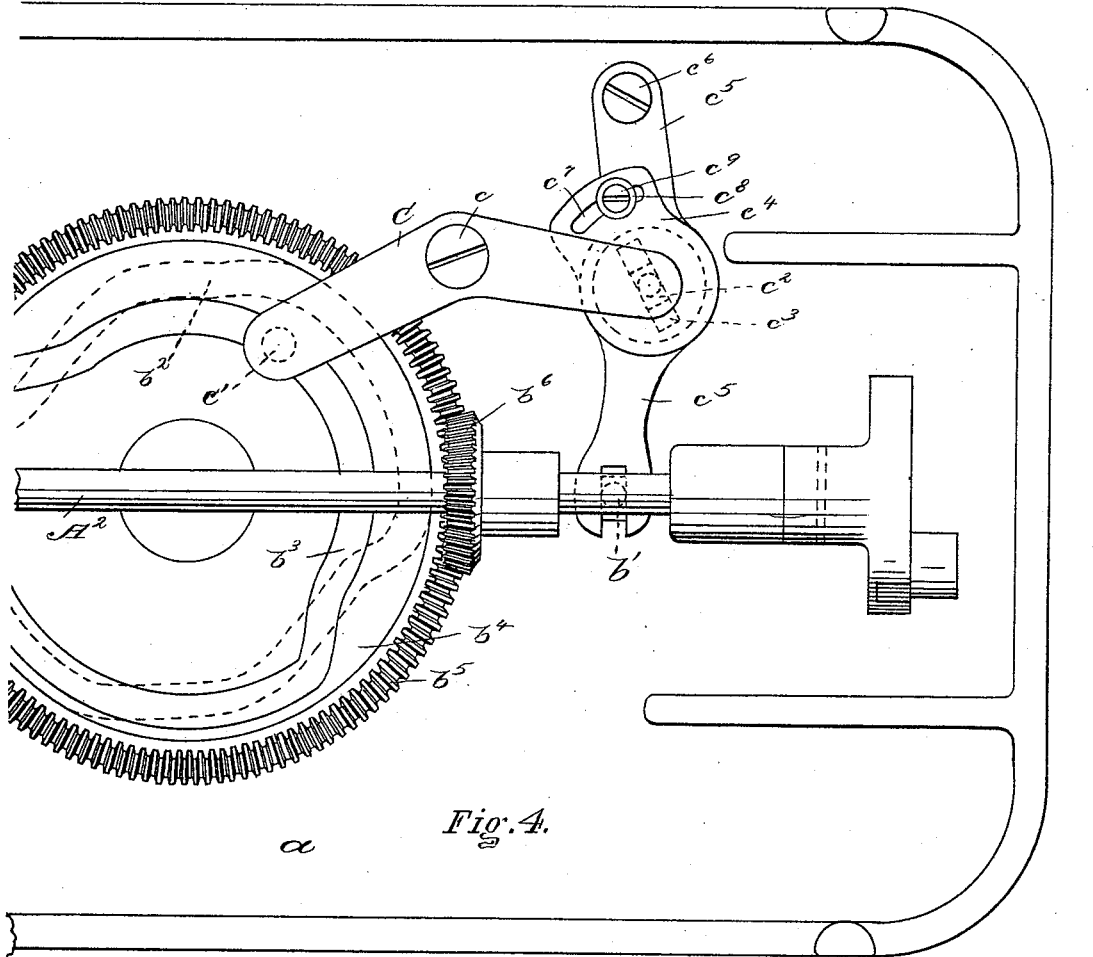
Figure 5:
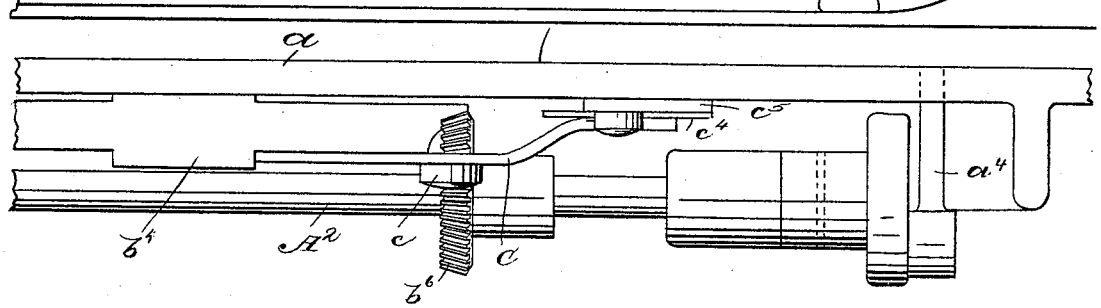

In the drawings:—Figure 1 is a view in side elevation of a machine having the features of my invention. Fig. 2 is a view in front elevation thereof. Fig. 3 is a view of the machine in section and elevation. Fig. 1ª is a view in plan illustrating the feed dog, its surrounding movable plate, the throat and the throat clearing plate. Fig. 1ᵇ is a detail view to illustrate the throat and operating devices, the feed dog and throat clearing plate being removed. Fig. 1ᶜ is a view in elevation to further illustrate the parts shown in Fig. 1ᵇ. Fig. 1ᵈ is a sectional view further illustrating these parts. Fig. 4 is a view enlarged of a portion of the machine inverted to show the different form of connection between the feed-bar and its operating cam, from that shown and described in said patent. Fig. 5 is a view in sectional elevation of parts represented in Fig. 4. Fig. 6 is a sectional elevation of the lower portion of the front of the left end of the machine, representing the throat and other operative parts in one position. Fig. 7 is a sectional elevation of the same parts representing them in another position. Fig. 8 is a view in plan of the presser-foot. Fig. 9 is a sectional view thereof. Fig. 10 is a view in elevation of the head of the machine from the left end, the face plate being removed to show the parts beyond. Fig. 11 is a view in side elevation of the head of the machine from the front side, the front side wall of the head being removed. Fig. 12 represents in end elevation and Fig. 13 in plan the two members of the take-up. Fig. 14 represents in front elevation the cam for operating the take-up. Also the cam for operating the thread drawing and gripping devices. Fig. 15 is a view in rear elevation to show the cam for operating the thread drawing and gripping devices and the operation of the connecting mechanism. Fig. 16 is a view in rear elevation of the thread drawing and gripping devices. Fig. 17 is an elevation thereof from the front side of the machine. Fig. 18 is a view in plan of said devices. Fig. 18ª is a detail view of the stud on which the tension disks are mounted. Fig. 19 is a view in elevation from the front end of the machine showing the drawing and gripping devices in one position, that is, in the position of drawing the thread and gripping it. Fig. 20 represents the same parts in a different position from that shown in Fig. 19, the thread being released and the drawing arm being lifted preparatory to again drawing the thread. Fig. 21 is a view in elevation of the thread check lever from the right end of the machine and Fig. 22 a view in end elevation thereof. Fig. 23 is a view in elevation showing still another position of the parts shown in Figs. 6 and 7. Fig. 24 is a detail view to show more especially the movable throat and the way it is supported and operated. Fig. 25 is a view in plan of the parts below the feed dog to still further illustrate the manner of operating the movable throat. Fig. 26 is a view in plan of the same parts, a part of the plate upon which the feed dog rests being removed to show in plan the arm or lever to the end of which the movable throat is attached. Fig. 27 is a bottom view of my improved machine. Fig. 28 is a top view of the work-plate thereof. Fig. 29 is a detail elevation of the presser-foot, and Fig. 30 a detail view of the check tension. Fig. 31 illustrates a slight modification of the take-up.

A is the arm of the machine.

$a$ is the bed, $a^2$ the head.

A' is the main shaft of the machine, which operates directly the needle-bar, the take-up and the thread drawing and gripping mechanism.

$A^2$ is a shaft below the bed plate of the machine and it operates the cloth feeding device, the rising and falling throat and the shuttle. It is connected with the shaft $A'$ by a crank $a^3$ and pitman-lever $a^4$.

In the bed of the machine is a recess B of a size to receive the feed bar $b$. This feed bar is like that described in said Patent No. 420,073, and is pivoted at its rear end by a pin $b'$ to a lever $c^5$ beneath the bed of the machine and has reciprocating and oscillating movements imparted to it by cam grooves $b^2$, $b^3$ in the cam wheel $b^4$. The cam wheel has upon its under edge a bevel gear $b^5$ and a bevel gear $b^6$ upon the under shaft $A^2$ engages the said bevel gear $b^5$. The upper cam groove $b^2$ or the one which imparts the oscillating movement to the feed bar is connected with it by mechanism like that described in my said patent, namely, the movable block $b^7$, arranged to slide in a transverse slot in the machine bed and having a pin $b^{17}$ which enters a slot or recess $b^{18}$ in the feed bar $b$ and link $b^8$ and a lever $b^9$ connected at one end with the link and at the other end by a cam pin with the upper cam groove. The connection between the lower cam groove and the feed bar is somewhat different from that described in said patent and it comprises a lever C, pivoted to the bed of the machine at $c$, having at one end a cam pin $c'$, to enter the cam groove $b^3$ and at the other end screw or pin $c^{10}$ carrying a block $c^2$ which slides in a slot $c^3$ in the adjusting piece $c^4$. This adjusting piece is carried by the lever $c^5$ which is pivoted at $c^6$ to the bed of the machine and is connected at its other end with the feed bar $b$ by the pin $b'$. The adjusting piece is adapted to be turned upon this lever $c^5$ to change the angle of the slide way $c^3$ and to be fastened to the lever in any desired position. This I have represented as accomplished by means of the slot $c^7$ in the adjusting piece and the clamp washer $c^8$ and clamp screw $c^9$ which extends through the slot and screws into the lever $c^5$. By loosening the clamping screw, the adjusting piece $c^4$ is turned upon the lever $c^5$ to any desired angle and is then locked in its new position by tightening the clamping screw. This mechanism provides a simple and efficient means of adjusting the throw of the lever $c^5$ and consequently the extent of reciprocating movement of the feed bar and feed dog.

D is the feed dog. It is like that described in my said patent and has the same movements imparted to it by the same operative mechanism, that is, it has the reciprocating and oscillating movements of the feed bar and also rising and falling movements, the rising and falling movements being imparted to it by means of the cam $d$ on the lower shaft $A^2$, the rocker shaft $d'$ having one arm $d^2$ connected with the cam to be operated by it and another arm $d^3$ connected with the lever $d^4$ which imparts the rising and falling movements to the feed dog. The feed dog is open at its center and works around the needle throat. The throat consists of a short tube $e$, fastened to the end $e'$ of the lever $e^2$, (see Fig. 24.) This lever $e^2$ is pivoted at $e^3$ to the shuttle ring $e^4$ and is connected with the lever $d^4$ by a pin $e^5$, which enters a hole in the lever. (See Figs. 6, 7, 23, 24 and 25.) This manner of holding the throat and operating it causes the throat to be moved downward upon the upward movement of the feed dog, (see Fig. 6) or while the fabric is clamped between the presser-foot and the feed-dog is being fed, and is thereby removed or disengaged from the fabric sufficiently to relieve it from friction and to prevent threads catching upon the throat; at the end of the feeding movement of the dog it is returned to its original or sewing position, (see Fig. 7,) the feeding dog then falling. These movements of the throat are obtained from the feed-dog lifting lever, $d^4$, as the lever carrying the throat is so connected with said lever that upon its upward movement the throat is moved downward while upon its downward movement the throat is lifted.

$D'$ is the shuttle and $D^2$ the cop-holder contained therein. They are operated as in the manner common to the Standard machine.

F is the presser foot. It is carried at the lower end of the vertically movable presser bar $f$, which is supported in fixed bearings in the head $a^2$ and is lifted and lowered by the lever $f'$ which is connected with the presser-bar in the ordinary way. The presser-foot comprises a flat plate $f^2$ of considerable area having an upwardly rounded edge $f^3$ extending entirely about it. The plate is of a size to cover the feed dog and its range of movement. The upwardly rounded edge $f^3$ of the presser foot permits the work to move under the latter in any direction when acted on by the six-motioned feed dog which moves the work laterally as well as forward, or forward and backward. It may be made of glass or other suitable substance. I prefer that it be made of glass or other transparent material in order that the work may be seen through it. On account of size and for other reasons, it is necessary that it have a universal adaptability given it to automatically conform or vary its angle or bearing upon the material or fabric as the stitching proceeds. To give it this adaptability of automatic adjustment it is mounted upon the arm $f^4$ which attaches it to the lower end of the presser-bar by two concentric rings $f^5$, $f^6$. The ring $f^5$ is preferably formed integral with the arm $f^4$ but not necessarily so. The inner ring $f^6$ is connected with the outer ring $f^5$ by pivots or pins $f^7$, (see Fig. 8) and the presser plate F is secured in turn to the inner ring by means of pins $f^8$ which extend from said inner ring at right angles to the pins $f^7$ into studs $f^9$ extending upward from the upper surface of the presser plate, (see Fig. 9.) This provides practically a universal joint between the presser plate and the arm $f^4$. The presser plate has the hole $f^{10}$ through which the needle plies and a slight teat $f^{11}$ on the under side of the presser plate about the hole $f^{10}$, (see Fig. 9.) This is for the purpose of enabling the throat $e$ to co-operate with the presser plate in holding the needle and shuttle threads.

G is the needle bar. It is supported by the head $a^2$ and carries at its lower end the eye pointed needle $g$. It is reciprocated by means of the crank pin $g'$ (see Fig. 10) upon the disk $g^2$ at the end of the main shaft $A'$ and the lever $g^3$ which is pivoted to the head $a^2$ at $g^4$ and which has the long angular slot $g^5$ formed therein. The lever is pivoted at one side of the crank disk. It is connected with the needle bar G by the pitman $g^6$ which is attached by a pivot to the outer end of the lever. The result of this construction is that the movement of the needle is variable, that is, it is moved upward more rapidly than it is moved downward, the crank pin $g'$ then approaching the fulcrum $g^4$ of the lever, while upon the downward movement of the needle bar the crank pin $g'$ moves away from the fulcrum $g^4$.

The take-up is duplex in character, that is, it is obtained or effected by the action of the two bell-crank take-up arms or levers H H'. The upper arm H is curved downwardly and has the hole $h$ for the passage of the needle thread and the arm H' is substantially straight, shorter than the arm H and has the holes $h^2$ for the needle thread. The arm H is pivoted at $h^3$ to the head $a^2$ and the arm H' is pivoted at $h^4$ to said head and the arms are connected with each other so that an impulse given one of them is transmitted to both. I have shown this connection as obtained by providing each of the arms with integral shorter connecting arms, the arm H having the short arm $h^5$ and the arm H' the short arm $h^6$. The arm $h^5$ extends beyond or overlaps the arm $h^6$ and has a pin $h^7$ which enters a long recess $h^8$ extending inward from the end of the short arm $h^6$, (see Figs. 11, 12 and 13.) This connects the two arms H H' so that the outer ends of both arms approach each other simultaneously or move away from each other simultaneously. In lieu of the pin $h^7$ and recess $h^8$ each of the arms $h^5$ $h^6$ may be provided with a sector gear $H^2$ to intermesh. (See Fig. 31.)

To move the arms H H' at the proper interval of time, there is located on the arm $h^5$ a cam pin $h^9$, (see Fig. 13.) This cam pin enters the cylinder cam groove $h^{10}$ in the edge of the disk $g^2$ and the rotation of the disk causes the cam to move the two arms of the take-up as will be hereinafter specified.

The thread drawing or pull-off and gripping or checking mechanism comprises a pull-off lever M pivoted at $m$ to a bracket $m'$ attached to the upper surface of the arm A adjacent to the head $a^2$. The lever M extends along the right side of the upper part $m^3$ of the bracket between it and the thread guide $m^4$, (see Figs. 17, 18 and 19.) Movement is imparted to the lever M by means of the edge cam $m^5$, (see Figs. 14 and 15) which is formed on the back of the disk $g^2$. The lever has a cam roll $m^6$ which rests on the edge cam and at the desired interval of time, the lever M is moved downward between the part $m^3$ of the bracket $m'$ and the thread support $m^4$, as represented in Fig. 19, and serves to draw thread from the spool. The thread is led from the spool through a support $m^4$ and also through guides $m^7$, extending upward from the bed $m^8$ formed on the bracket $m'$ and through the tension N and a thread holder or guide upon the side of the head $a^2$, to the duplex take-up. To check and hold the thread at stated intervals as will hereinafter appear, there is used in connection with the bed $m^8$ a movable nipping arm or lever $m^{10}$. This lever is pivoted at $m^{11}$ to the bracket $m'$ in a manner to permit the under surface $m^{12}$ of the arm $m^{10}$ to shut upon the upper surface of the bed $m^8$, (see Fig. 19.) The lever $m^{10}$ has a downwardly extending arm $m^{13}$ which carries the cam roll $m^{14}$ arranged to bear against the operating surface of the cam $m^{15}$ on the thread drawing or pull-off lever M, (see Fig. 19,) said nipping arm $m^{10}$ being normally held against said bed by a spring $m^{19}$. The said spring $m^{19}$ is seated in an arm of the bracket $m'$, to which said nipping arm or lever $m^{10}$ is pivoted, and presses against the depending arm $m^{13}$ of the nipping lever. (See Fig. 16.) This cam $m^{15}$ is so shaped that upon the upward movement of the lever M, the nipping arm $m^{10}$ is lifted by said cam $m^{15}$ against the stress of the spring $m^{19}$, from the bed $m^8$ and upon its downward movement it is held upon said bed by said spring, to nip the thread. The lever M is lifted, as above stated, by the cam $m^5$. It is held in contact with the cam and depressed by means of a coil spring $m^{16}$, (see Fig. 18) which surrounds the stud $m^{17}$ forming the pivot of the lever M, one end of the spring being attached to the stud and the other to the bracket $m'$.

The tension N is comprised of two disks $n$ $n'$ mounted upon the screw stud $n^2$, the stud having a hole $n^3$, (see Fig. 18$^a$) through which the thread passes. This hole has a threading passage or opening $n^4$ (see Fig. 18$^a$) by means of which the thread is introduced to the hole. The hole is between the two disks $n$ $n'$ in line with the bed $m^8$. The disk $n'$ is set against the disk $n$ and the thread by the spring $n^5$ and adjusting nut $n^6$, (see Figs. 16 and 18.) Between the take-up and the needle throat is a thread retainer or check tension (see Figs. 1 and 30) for exerting a light stress upon the thread. This thread retaining device or check tension comprises the plate $o$ which is fastened to the outside of the face plate $a^7$ in a manner to provide a narrow space between it and the said face plate, and a spring O the lower end $o'$ of which is curved outwardly and extends through a hole $o^2$ in the face plate to bear against the inner surface of the plate o, the thread passing between the curved surface of the spring and the inner surface of said plate.

The operation of the machine is as follows: The work is placed upon the work plate and the presser foot moved down upon it and the machine being started, the throat e is raised and the needle moves downward through the material and throat to present its thread to the shuttle. Meanwhile the feed dog lowers and moves backward preparatory to feeding,—the needle, presser-foot, and the throat holding the material during this backward movement of the feed dog. The needle then lifts from the material, the throat falls and the feed dog rises and then moves in the direction in which it is desired that the material be fed. The action of the needle thread and its operating devices, namely, the needle, thread pull-off, thread check, tension and take-up during the operation of the machine, is as follows: Upon the feeding of the material by the feed dog, the take-up operates to give off the thread by the movement of the two arms of the take-up toward each other, it being understood that the thread passes from the tension through the hole in the lower arm of the take-up to the hole in the upper arm of the take-up and thence to the check tension and the needle. This giving off of the thread must take place each time that the material is moved by the feed dog, in order that the thread may not draw during such feed movement of the material; this gives the thread the least possible tension during such feeding movement of material, the tension at such time being by the thread retainer or check tension and not by the main tension. Inasmuch as the feed movements of the material vary in extent, and are, as a rule, quite long compared with the ordinary feeding of material in straight line stitching, it is especially desirable that the thread be given off by the take-up during the feeding movement, and in the stitching of very light, thin and elastic fabrics, like gauze underwear, it is also necessary during the feeding movement that the thread be retained by the very lightest tension. The said tension must not exceed the resistance of the material to the draft of the thread and it is for this reason also that the take-ups give off thread during the feed movement of the material and that the thread is held in restraint only by a very light auxiliary or check tension, which in fact is not the tension device of the machine but simply a thread retainer offering the very lightest resistance to the draft of the needle possible. Before the setting of the stitch it becomes necessary not only to take up the thread but at the same time to give to the take-up the amount of thread which has been given out to the stitch during the feed movement of the material. It must be borne in mind that the extent of thread used in this feed movement of the material varies, sometimes being short and at other times long, according to the nature or design of the stitch which is being sewed. I give the take-up this additional and variable extent of thread automatically, immediately upon the completion of the feed movement of the material, and just after the needle has penetrated the material and thus indicated the length or amount of thread that it is necessary to give to the take-up from the spool, by causing the take-up arms to separate and the nip upon the thread to be released so that the thread is free to be drawn, by the separation of the take-up arms, from the spool; the take-up arms draw in this way enough thread to compensate for the length that has been given out to the last stitch sewed or between it and the next stitch which is about to be sewed. The take-ups then immediately again give off thread, the needle moving downward to present a loop of the needle thread to the shuttle, and immediately upon the release or giving out of the thread by the take-up, the thread is gripped between the take-up and the spool by the automatic nipping arm or lever which shuts upon the thread and holds it fast during the passage of the shuttle through the loop of the needle thread and tightening the stitch by the take-ups. There is no thread drawn from the spool by the take-up during the passage of the shuttle through the loop and this enables me to govern the length of thread drawn from the spool, the thread then being positively held upon the spool side of the take-up causes all the thread which is used in the stitch to be drawn during and immediately after the feeding of the fabric, and before the eye of the needle has passed through the work. The nipping arm operates to hold the needle thread until the take-up has reached or very nearly reached its original position. While the nipping arm is holding the needle thread, the thread pull-off by its side, between it and the spool, operates by its downward movement to draw thread from the spool, the action of this thread pull-off being simply to furnish loose thread on the spool side of the nipping arm. The main tension operates upon the thread during the interval that the take-ups are drawing thread from the spool. It will be observed that the first giving off movement of the take-ups, or that which takes place during the feeding of material, is given the take-up arms by one section of the cam and that movement of the arms of the take-up during the forming of the loop and the passage of the shuttle through it and the drawing back of the needle thread, is given by another section of the cam.

I have shown the take-up as consisting of two arms. This construction I prefer because it enables me to get a large amount of thread by a comparatively short movement of the arms and in the cam, but I do not, of course, confine myself to a take-up having two arms, as one having one arm and sufficient throw will answer.

I have mentioned incidentally above, that the mechanism for reciprocating the needle bar has a differential movement. This is for the purpose of withdrawing the needle from the material as quickly as possible and for holding it from the material for as long an interval as possible in order to give the most time to the operation of the material feeding devices.

It will be observed that in the operation of the lever M the surface or cam $m^{15}$ thereof is so shaped that it moves the thread nipping arm $m^{10}$ downward at the beginning of its downward movement and then holds it stationary while the lever itself continues its downward movement and this permits the said lever to continue its downward movement after the thread nipping arm $m^{10}$ comes to rest and until the lever M is moved upward to near its original position.

The rising and falling throat effects two purposes. First, it clamps the needle thread on the stitch side during the engagement of the shuttle with the loop so that the sudden shock of the engagement of the shuttle with the loop is not communicated to the part of the thread between it and the last stitch sewed and the material is not puckered or wrinkled. Second, it is withdrawn from contact with the under surface of the material during its feeding movement and from the threads on the under surface thereof so that they cannot catch upon it as they pass over it.

While I have represented the various features of my invention as used in connection with the machine of the Standard type, I would not be understood as limiting them to such as they may be employed upon any sewing machine or in connection with any mechanism for giving or imparting to them the movements herein specified.

I prefer that there be attached to the lever which imparts the lifting movement to the feed dog the thin plate E′ having a hole $E^2$ through which the throat rises and falls, see Figs. $1^a$, $1^b$, $1^c$, and $1^d$. This clears the throat from anything which may lodge upon it, or in other words, said plate E′ serves as a stripper for the rising and falling throat. I also prefer to mount upon the feed bar a thin plate $E^3$ to surround the feed dog and having a hole in which the feed dog plays up and down; this furnishes a moving support for the fabric outside of the feed dog.

Having thus fully described my invention, I claim and desire to obtain by Letters Patent of the United States—

1. In a sewing machine, the combination with the stitch forming devices thereof, of the feed bar $b$ provided with the feed dog D, operating mechanism for vibrating and reciprocating said feed bar, an arm or lever $d^4$ by which the said feed dog is lifted at proper intervals, a throat $e$, the lever $e^2$ by which the said throat is carried and which is pivoted between its ends at $e^3$ to a stationary part of the machine and connected by a pin $e^5$ at its end opposite to said throat to said arm or lever $d^4$; whereby the said throat will be lifted as the feed dog is lowered, and vice versa.

2. In a sewing machine, the combination with the feed lever $b$ provided with the feed dog D, operating mechanism for reciprocating and vibrating said lever, the arm or lever $d^4$ by which said feed dog is lifted, operating mechanism for said arm or lever $d^4$, the plate E′ carried by said arm or lever $d^4$ and provided with an opening, the needle throat $e$ operating through said opening, the lever $e^2$ by which said needle throat is carried, and which is connected to the said arm or lever $d^4$ to be operated thereby so that the said throat will be lifted when the feed bar is lowered, and vice versa.

3. In a sewing machine, a presser foot comprising a flat plate $f^2$ of considerable area having entirely about it an upwardly rounded edge $f^3$, and a presser bar supported in fixed bearings and with which bar said foot has a jointed connection, combined with a feed dog and mechanism for imparting six-motioned movements to said feed dog to cause the latter to feed the work laterally as well as forward, or forward and backward, substantially as and for the purposes described.

4. In a sewing machine, the combination with a presser-foot bar, of the presser-foot, secured by pivots to a ring, said ring secured by pivots, at right angles to those attaching the said foot to the first named ring, to another ring carried at the end of the presser bar, substantially as described.

5. In a variable stitch sewing machine, the combination with the stitch forming devices thereof, of a feed dog, mechanism for imparting variable feed movements to the said feed dog, a take-up, means for operating said take-up to cause it to slacken the needle thread during the movement of the feed dog, and to take up said thread to tighten the stitch after the needle has entered the material and before the next stitch in order is formed, a thread nipping device arranged to grip the thread between the take-up and the spool during the time the stitch is being tightened, and a pull-off operated to draw thread from the spool during the time of the feeding movement and when the take-up has slackened the thread, to permit the work to be fed without any considerable drag upon the thread or threads running thereto.

6. In a sewing machine, the combination with the stitch-forming mechanism thereof, of a presser foot, a feed dog, mechanism for imparting variable feeding movements to said feed dog, and a rising and falling device arranged beneath the said presser foot and timed to nip the needle thread against said presser foot during the time when the shuttle is expanding a loop of needle thread, so that when a loop is expanded for the passage of the shuttle the thread will be drawn entirely from the take-up side of the needle and a puckering draft upon the thread at the stitch side of the needle be avoided, substantially as set forth.

7. In a sewing machine, the combination with the stitch forming mechanism thereof, of a presser foot, a feed dog, mechanism for imparting variable feed movements to said feed dog, a rising and falling throat plate arranged to nip the needle thread against the said presser foot during the times when the shuttle is expanding the loops of thread, whereby the thread for the said loops will be drawn entirely from the take-up side of the needle and puckering draft upon the thread running to the work be avoided.

8. In a sewing machine of the character specified, the combination with the stitch forming devices thereof comprising a needle and a shuttle and their operating mechanism, of a feed dog, mechanism for imparting variable feeding movements to said feed dog, a take-up, and means for operating said take-up to impart two releasing and two taking-up movements thereto during a complete reciprocation of the needle, the parts being timed to cause one of said releasing movements to occur to let off the thread during the feeding movement, and to take it up at the end of the operation of the feed and to cause the other releasing movement to occur to let off the thread during the time when the shuttle is expanding and passing through a loop and to then take up the thread to tighten the stitch, substantially as set forth.

9. In a machine of the character specified, the combination of the stitch forming mechanism, a feed dog, means for imparting variable feed movements to the said feed dog, a take up timed to slacken the thread while the shuttle is taking a loop, an automatic thread gripping device to nip and hold the thread between the take-up and the spool during the slackening movement of the take-up, and a pull-off also timed to draw thread from the spool during the slackening movements of the take-up and while the thread is nipped by the said gripping device.

10. The combination in a machine of the character specified, of the stitch forming devices, the feed dog, the presser-foot, the take-up and means to operate it to give off thread during the engagement of the shuttle with the loop, a nipping device, such as the throat and presser-foot, to nip the needle thread on the stitch side during such giving off movement of the take-up, and a thread nipping device or stop to operate upon the thread, and check it between the take-up and the spool, as and for the purposes described.

11. The combination with the driving shaft A′ provided near its forward end with a cylinder having the cam groove $h^{10}$, of the bell-crank take-up lever H having the arm $h^5$ provided with the pin or stud $h^9$, the bell-crank take up lever H′ having the arm $h^6$ operatively connected with the said arm $h^5$ to receive movement from the latter, the said take-up levers being both pivoted to the head or forward part of the arm of the machine, said cam groove being so constructed as to impart two releasing or slackening and two taking-up movements to said take-up levers during each complete revolution of said cylinder, to operate substantially as described.

12. The combination of the bed $m^8$, the bent lever $m^{10}$ pivoted at $m^{11}$, having an arm $m^{13}$ and a cam roll $m^{14}$ thereon, with the lever M pivoted at $m$ and having the cam $m^{15}$ to co-act with the cam roll $m^{14}$ on the lever $m^{10}$, and the cam $m^5$ upon the shaft A′ which co-acts with the cam roll $m^6$, as and for the purposes described.

13. The combination of the bed $m^8$, the bent lever $m^{10}$ pivoted at $m^{11}$, having an arm $m^{13}$ and a cam roll $m^{14}$ thereon, with the lever M pivoted at $m$, and having the cam roll $m^6$ and cam $m^{15}$ to co-act with the cam roll $m^{14}$ on the lever $m^{10}$, the cam $m^5$ upon the shaft A′, which co-acts with the cam roll $m^6$ and a spring $m^{16}$ for holding the cam roll $m^6$ in contact with its operative cam, as and for the purposes described.

J. THOS. JONES.

Witnesses:
P. C. J. DRAYALIS,
EDWIN T. JONES.